April 19, 1966   J. P. KING   3,246,385
METHOD OF MAKING A FORCE-SENSING GAGE
Original Filed Jan. 12, 1960   2 Sheets-Sheet 1
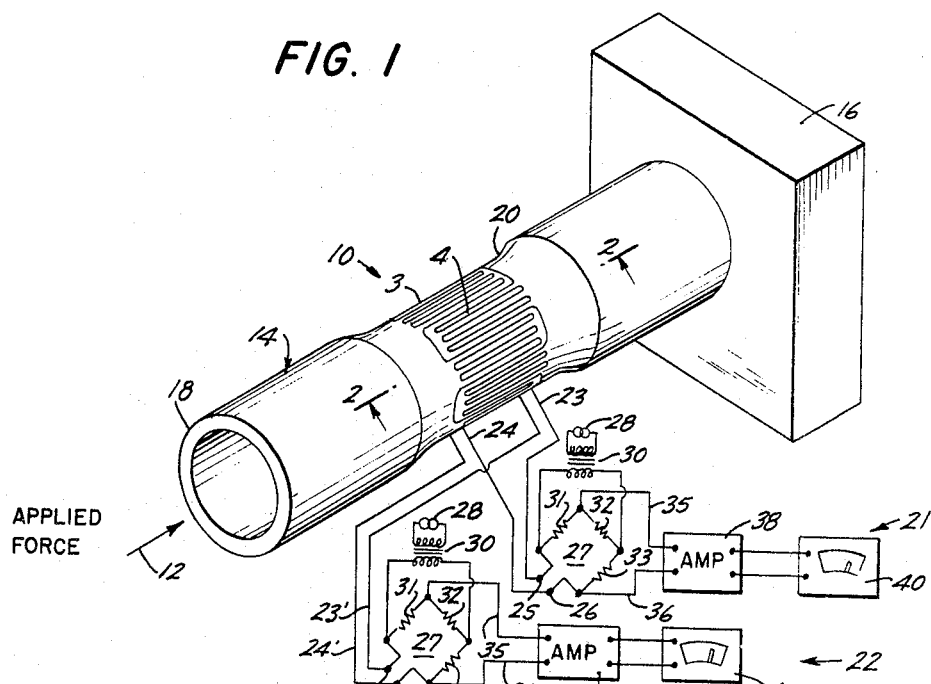
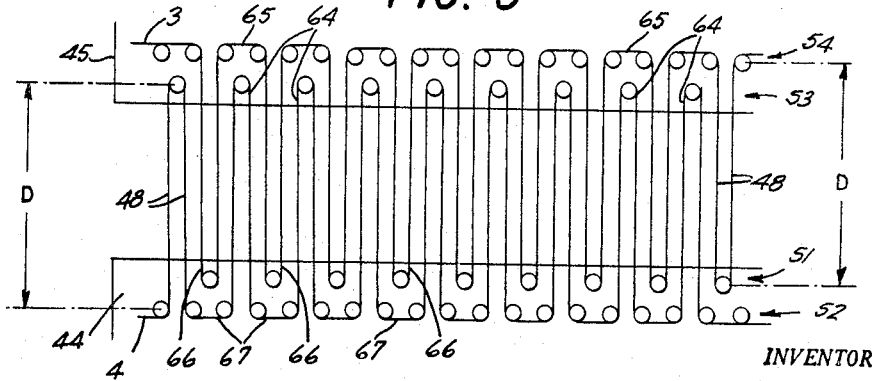
INVENTOR.
JOHN P. KING
BY
Curtis, Morris & Safford
ATTORNEYS April 19, 1966  J. P. KING  3,246,385
METHOD OF MAKING A FORCE-SENSING GAGE
Original Filed Jan. 12, 1960  2 Sheets-Sheet 2

INVENTOR.
JOHN P. KING
BY
Curtis, Morris & Safford
ATTORNEYS

United States Patent Office 3,246,385
Patented Apr. 19, 1966

3,246,385
METHOD OF MAKING A FORCE-SENSING GAGE
John P. King, Elkton, Md., assignor to Thiokol
Chemical Corporation, Bristol, Pa.
Original application Jan. 12, 1960, Ser. No. 1,945, now
Patent No. 3,064,221, dated Nov. 13, 1963. Divided
and this application Dec. 26, 1961, Ser. No. 168,295
4 Claims. (Cl. 29—155.5)

The present invention relates to force gages using strain-sensing wire elements and to methods of making force gages. More particularly, the present invention relates to force gages using a pair of strain-sensing wire elements which are independent of each other but are interfitted and arranged closely adjacent one to another so that each wire element is subjected to substantially identical environmental conditions. Consequently, each wire element provides a substantially identical but independent indication of the condition under test. Gages embodying this invention enable two separate but identical measurements of force to be made at the same time.

During test programs on large-scale equipment involving measurements of large values of force, there are many instances when the equipment under test is intended to be operated at the maximum limit of its performance capabilities. When making such tests, the test gages are subjected to large stresses and strains and occasionally a wire element of the strain-sensing type fails mid-way through a test procedure. With prior gages, the failure of such a gage element necessitated the repetition of the test procedure, which was time-consuming and expensive. Moreover, if an unforeseen characteristic became apparent during the first test, then the failure of the gage element could cause the loss of valuable data which was often found difficult to reproduced in a subsequent test procedure.

Among the many advantages of the force gage described herein as illustrative of the present invention are those resulting from the fact that two independent but identical strain-sensing wire elements are provided in the gage. If either wire element should fail during a critical test, nevertheless, the other wire element can remain in operation to yield the desired measurement results, thus avoiding the necessity for repeating the whole test.

Moreover, the two independent but identically responsive wire elements enable the use of two completely independent measurement channels. Therefore, if any test instrument should malfunction so as to interrupt one channel of measurement, the other channel can remain in operation so as to complete the test cycle. In addition to test purposes, these types of gages can be used for control purposes. By virtue of the dual sensing-wire elements, two completely separate control circuits are provided operating in parallel, thus providing a greatly increased reliability in the control.

There have been attempts in the past to use a pair of separate strain-sensing wire elements each of which was intended to be responsive to the same condition, but these prior attempts have met with a number of difficulties. For example, the two wire elements were spaced apart on a test member so that they were never subjected to identical strain or temperature environments, and differences between their response characteristics often occurred.

In force gages such as described herein as illustrative of the invention, each of the strain-sensing wire elements is arranged as a grid upon a force-responsive member which is subjected to the force to be measured. These two grids are positioned in an interrupted interval pattern which greatly reduces the physical separation of the two wire grids on the member. Accordingly, each grid has substantially the same strain and temperature environment.

Moreover, during fabrication of the gage, both grids are adapted to be applied simultaneously to the responsive member, resulting in a manufacturing labor economy. Because both grids are bonded to the responsive member at the same time and under the same conditions, they are provided with substantially identical environments.

This is a division of application Serial No. 1,945 now Patent No. 3,064,221, granted November 13, 1963.

A further advantage is that the actual length of the two wire sensing elements is shortened because of the elimination of the spacing between grids. This increases the over-all natural frequency of the gage and enables higher frequency force variations to be measured.

The various features, aspects, and advantages of this invention will in part be pointed out in and in part apparent from the following description of a gage system incorporating the invention and the method of making, considered in conjunction with the accompanying drawings, in which:

FIGURE 1 is a partial perspective and partial diagrammatic illustration of a force measuring system having dual measurement channels and embodying the present invention;

FIGURE 2 is a longitudinal sectional view, on enlarged scale, taken through one wall of the tubular responsive member in the region of the strain-sensing wire elements;

FIGURE 5 illustrates a pair of grids having an interrupted interval pattern with fewer parallel wire segments in each interval.

Figure 3:
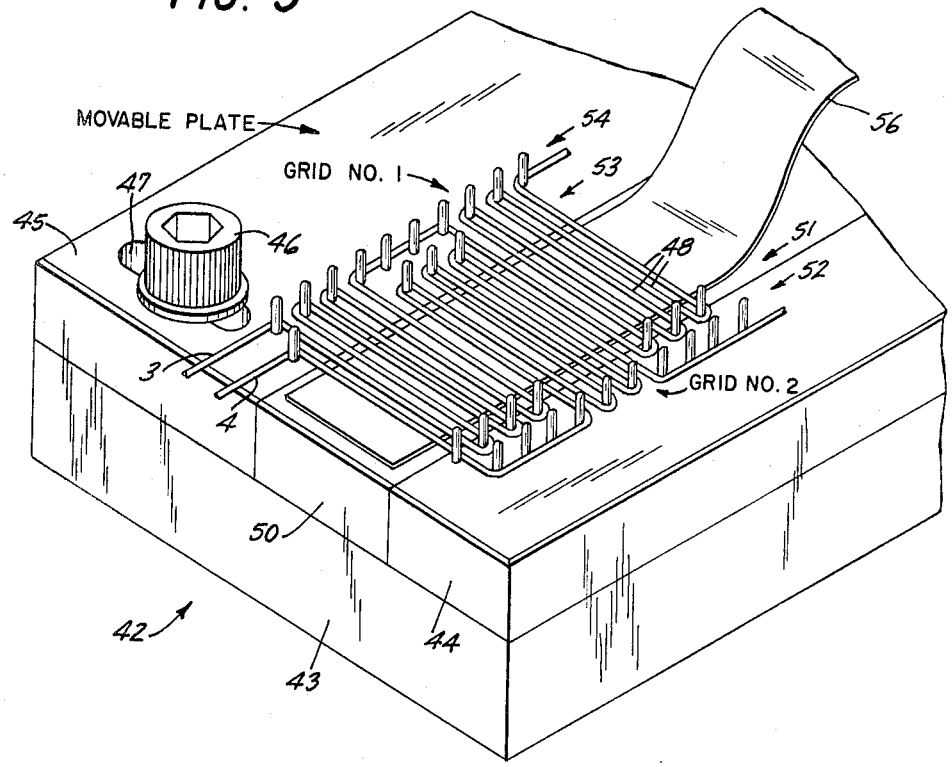
FIGURE 3 is a perspective view illustrating the method of winding the two grids in an interrupted interval pattern in interjacent relationship on a grid-winding jig.

As shown in FIGURE 1 a force gage, generally indicated at 10 is arranged to be responsive to an axially directed applied force 12. The force gage includes an elongated elastic member 14 in which the longitudinal strain is directly proportional to the magnitude of the force imposed. This force-responsive member is shown herein as a precision machined steel tube formed from a high quality air-hardened die steel, for example, such as one containing approximately 0.5% carbon, 0.3% manganese, 1.0% chromium and 0.7% molybdenum. One end of this force-responsive member is held in position by being secured to a fixed mounting 16, and the force to be measured is applied to the opposite end of the member 14. The tubular wall 18 of the member 14 has a uniform thickness throughout except for the central portion thereof which is carefully ground down and lapped, both inside and out, to provide a thin uniform central wall area 20 having a thickness less than 50% of the remainder of the member. Consequently, the deformation of this central wall area 20, when the force 12 is applied, is uniform throughout and is markedly greater than the deformation of the remainder of the tubular wall 18.

In order to sense the magnitude of the applied force a pair of grids 1 and 2 formed by strain-sensing wire elements 3 and 4, respectively, are wrapped around the thin uniform central wall area 20. Each of the two wire elements is formed into a grid having a pattern including elongated hairpin-shaped U-bends having parallel wire segments extend longitudinally of the tubular member 14. This grid pattern of each wire is interrupted at intervals and the parallel wire segments of the other grid extend into the interval, so that the respective active portions of the two grids are in interjacent relationship, as also seen in FIGURES 2 and 3. Thus, each of the grids is subjected to substantially the same environment and ambient conditions for they both are bonded to the same central area of the tubular member 14 and they lie in interpacent relationship around this central area.

Advantageously, these two wire elements 3 and 4 are connected into two identical but separate circuits for controlling the actuation of suitable instruments for recording or indicating the applied force, thus forming two identical but independent measurement channels 21 and 22. For example, as shown, the two ends of the wire element 3 are connected by a pair of leads 23 and 24 to the input terminals 25 and 26 of a resistance bridge circuit 27. This bridge circuit is energized by a source 28 of alternating current of any desired frequency operating through an isolating transformer 30. The bridge circuit includes three resistance arms 31, 32, and 33 with the resistance wire element 3 forming the fourth bridge arm. The potential drop across the sensing element 3 varies in accordance with the changes in the applied force, thereby affecting the balance of the bridge 27 and causing an unbalance signal of magnitude proportional to the applied force to appear between the bridge output leads 35 and 36, which are connected to an alternating current amplifier 38. The amplified output from this amplifier is used to operate a suitable recording or indicating instrument 40, for example, a recording oscillograph.

Similarly, the opposite ends of the sensing wire element 4 are connected by a pair of leads 23' and 24' into a measurement channel 22 which is identical with the measurement channel 21, as indicated by corresponding reference numerals for corresponding components thereof.

Figure 4:
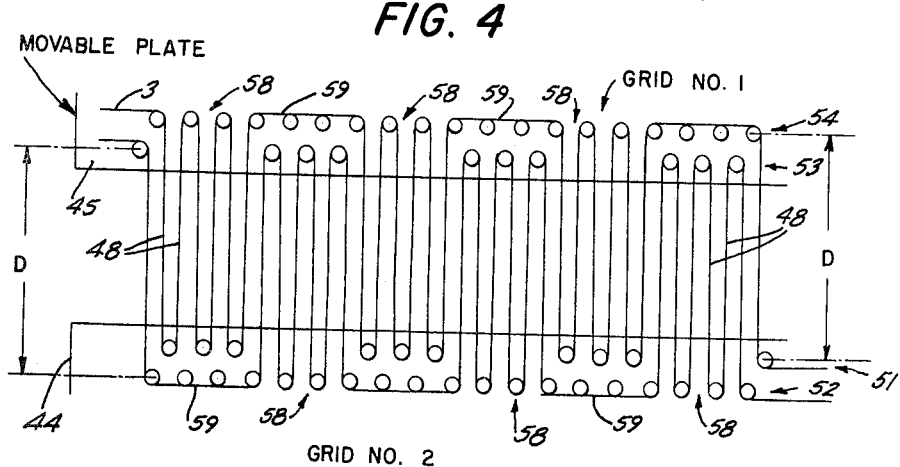
FIGURE 4 is a plan view of the jig showing the relationship of the two grids thereon.

In order to fabricate the two sensing grids 1 and 2, the two wire elements 3 and 4 are wound in an interrupted interval pattern as illustrated in FIGURES 3 and 4 upon a winding jig 42. This jig includes a base 43, a plate 44 which is fixed to the base and a movable plate 45. The movable plate can be locked in position by a pair of clamp screws, one of which is shown at 46, each passing through an elongated opening 47 in the movable plate and screwing into the base 43. For purposes of establishing the desired length of the parallel segments 48 of the two grids, a removable spacer bar 50 is fitted into the channel between the fixed plate 44 and the movable plate 45, and the movable plate is clamped into position closely adjacent to this spacer bar.

There are an inner and an outer row of grid alignment pins extending along the fixed plate 44 parallel to the side which faces the movable plate 45. During winding of the grids 1 and 2, the inner row 51 of these pins is used to hold one side of the first grid and the outer row 52 holds the corresponding side of the second grid. Similarly, an inner row 53 and an outer row 54 of pins on the movable plate 45 serve to hold the other sides of the grids 2 and 1, respectively.

Before commencing the winding, a wide flexible heat resistant band 56, for example, a tape of polytetrafluorethylene, e.g. "Teflon," is placed upon the spacer bar, and this band is arranged to cover substantially the full width of this bar. The wires 3 and 4 are threaded back and forth around the alignment pins to form each grid with groups 58 of parallel wire segments 48 and with intervals 59 between the successive groups of each grid into which are interfitted the respective groups of the other grid. During the winding the ends of the wire elements are temporarily secured to the jig by bits of masking tape.

After the forming of the grids is completed, the grid wires and the flexibile band are brought into closely adjacent relationship and the grids are coated with a thin layer of insulating cement, such as a thermosetting phenolic resin, e.g. "Bakelite" phenolic molding resin. Then the jig with the grids thereon is placed in an oven and the assembly is heated until the cement cures sufficiently to hold the grids in place on the band 56. The spacer bar is removed; the clamp screws are loosened; and the band 56 is then lifted from the jig with the grids adhering thereto.

As illustrated in FIGURE 2, a thin layer 60 of this same cement is applied around the central area 20 of the force-responsive member 14. The band 56 with the grids attached is wrapped around the member 14 with the grids on the inside against the cement layer 60. This tubular assembly is then cured in the oven so as to bond the wire elements 3 and 4 to the member 14.

After this bonding, the band 56 is stripped off, leaving the grids in proper alignment on the force-responsive member 14. A final outer thin coat 62 of the cement is applied over the wire grids, and a third oven curing completes the fabrication of the gage element 10. It will be appreciated that this method advantageously enables both grids to be assembled and applied simultaneously, thus providing economy in fabrication.

As shown in FIGURE 4, the spacing D between the respective rows of alignment pins 51 and 54 is exactly equal to the distance between the rows 52 and 53. Accordingly, the active lengths of the parallel wire segments 48 of the two interjacent grids are the same and provide a substantially identical response to the applied force.

The sensing elements 3 and 4 are fine metallic wires that are continuously solid throughout their length and having predetermined electrical strain characteristics. This wire may be of suitable and well-known resistance material having a low temperature coefficient of resistance, for example, an alloy of 43% nickel and the balance copper, such as that commercially available as "Constantan," "Advance," or an alloy of 13% manganese and the balance copper, commercially available from the Driver-Harris Company as "Manganin" resistance wire. Various other well-known materials may be used having good resistance properties as well as being capable of fabrication in small wire sizes. In this example, the sensing wires 3 and 4 have a diameter of 0.002 of an inch, and the length D of the parallel active wire segments is 1.5 inches.

From the foregoing it will be understood that the force gage and the method of making described above as illustrative of the present invention are well suited to provide the advantages set forth.

In FIGURE 5 is shown a grid configuration wherein each single hairpin-shaped U-bend 64 of the strain-sensing wire element 4 is positioned individually within an interval 65 of the grid formed by the wire element 3. Conversely, each hairpin-shaped U-bend 66 of the wire element 3 is positioned individually within an interval 67 of the other grid. This pattern has the advantage of providing pairs of parallel wire segments 48 of one grid alternating with pairs of parallel wire segments of the other grid in a band encircling the force-responsive member 14. Consequently, the parallel active wire segments of the two grids are in intimate interjacent relationship and are responsive to substantially identical environmental conditions.

Although the applied force is indicated as being a compressive force, for example, as would arise in testing the thrust of an aircraft engine or a rocket motor, it will be understood that this gage system is also convenient for measuring tension forces, for example, as would arise in measuring the drawbar pull of a locomotive or the pull of a tugboat.

Since many possible embodiments may be made of the various features of this invention and as the method and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:
1. The method of making a force-sensing gage of the type having a pair of continuous solid filaments of electrical conducting material in which the electrical resistance varies with strain for providing two independent but identical responses to an applied force comprising the steps of winding a first strand of the filament back and forth in a first area between a series of points successively alternately positioned on opposite sides of a given line then continuing said strand along parallel with said line for an interval and then again winding the strand back and forth in a second area between another series of points successively alternately positioned on opposite sides of said line, winding a second strand of the filament back and forth in a third area between a series of points within said interval between said first and second areas and successively alternately positioned on opposite sides of said line, then continuing said second strand along parallel with said line for an interval extending past said second area on the opposite side of said line from said interval of the first strand, and then again winding said second strand back and forth in a fourth area beyond said second area between a series of points successively alternately positioned on opposite sides of said line, then strippably cementing both of the wound filaments throughout their effective lengths to a flexible sheet material, removing the pair of filaments and sheet as a unit after the cementing has cured sufficiently to hold the filaments in their respective positions on the sheet, permanently cementing said filaments to the surface of a member adapted to have forces applied thereto, and stripping said sheet from the filaments after the latter cementing has cured sufficiently to hold the filaments in their respective positions on said member.

2. The method of making a force-sensing gage of the type having a pair of continuous solid filaments of electrical conducting material in which the electrical resistance of both filaments varies in a substantially identical manner with strain for providing two independent but identical responses to an applied force comprising the steps of winding a first filament back and forth between three points successively alternately positioned on opposite sides of a given line to form a pair of parallel segments of the first filament, then continuing said filament along parallel with said line for an interval and then again winding the filament back and forth between another three points successively alternately positioned on opposite sides of said line to form another pair of parallel segments of the first filament, winding a second filament back and forth between three points within said interval and successively alternately positioned on opposite sides of said line to form a pair of parallel segments of the second filament within said interval of the first filament, then continuing said second filament along parallel with said line for an interval on the opposite side of said line from said interval of the first filament, and then again winding said second filament back and forth between three points successively alternately positioned on opposite sides of said line to form another pair of parallel segments of the second filament within another interval of the first filament, then strippably cementing both of the wound filaments throughout their effective lengths to a flexible sheet material, removing the pair of filaments and sheet as a unit after the cementing has cured sufficiently to hold the filaments in their respective positions on the sheet, permanently cementing said filaments to the surface of a member adapted to have forces applied thereto while retaining them by said sheet, and stripping said sheet from the filaments after the latter cementing has cured sufficiently to hold the filaments in their respective wound positions on said member.

3. The method of making a force-sensing gage of the type having a pair of continuous solid elements of electrical conducting material in which the electrical resistance of both elements changes in a substantially identical manner in response to changes in the applied force comprising the repeated steps of winding a first element into at least one hairpin-shaped U-bend to form a plurality of parallel segments and then continuing said element to form an interval and then again winding said element into at least one hairpin-shaped U-bend to form another plurality of parallel segments, winding a second element into at least one hairpin-shaped U-bend within each interval of the first element to form pluralities of parallel segments of the second element which are parallel with and in interjacent relationship with the pluralities of parallel segments of the first element, then strippably bonding both of the wound elements throughout their effective lengths to sheet material, transferring the sheet material with the elements strippably bonded thereon to a test member, permanently bonding said wound elements to the test member while maintaining them in their respective wound positions by means of said sheet, and thereafter stripping the sheet from the elements after they are permanently bonded in place on the test member, whereby both of said elements are simultaneously bonded to the test member with the respective pluralities of parallel segments thereof in interjacent relationship, thereby providing substantially identical response characteristics for both elements.

4. The method of making a force-sensing gage of the type having a pair of continuous solid elements of electrical conducting material in which the electrical resistance of both elements changes in a substantially identical manner in response to changes in the applied force comprising the steps of winding a first element into a plurality of spaced groups of narrow elongated U-bends to form a plurality of parallel segments of the element in each group, said groups having intervals therebetween, winding a second element into a plurality of spaced groups of narrow elongated U-bends and positioning one of said latter groups within each interval of the first element to form pluralities of parallel segments of the second element which are parallel with and in interjacent relationship with the pluralities of parallel segments of the first element, then strippably bonding both of the wound elements throughout their effective lengths to sheet material, transferring the sheet material with the elements strippably bonded thereon to a test member, permanently bonding said wound elements to the test member while maintaining them in their respective wound positions by means of said sheet, and thereafter stripping the sheet from the elements after they are permanently bonded in place on the test member, whereby both of said elements are simultaneously permanently bonded to the test member with the respective pluralities of parallel segments thereof in interjacent relationship, thereby providing substantially identical response characteristics for both elements.

References Cited by the Examiner
UNITED STATES PATENTS

| | | | |
|---|---|---|---|
| 2,362,419 | 8/1943 | Van Horn | 313—272 |
| 2,722,587 | 11/1955 | Buzzetti et al. | 338—2 |
| 2,853,764 | 9/1958 | De Michele | 29—155.62 |
| 2,920,298 | 1/1960 | Hines | 338—3 |
| 2,927,878 | 3/1960 | Beckman | 338—2 |

J. W. BOCK, *Assistant Examiner.*